(12) United States Patent
Stenson

(10) Patent No.: US 10,954,084 B2
(45) Date of Patent: Mar. 23, 2021

(54) SYSTEMS, METHODS, AND APPARATUSES FOR CONTROLLING OBJECTS BEING UNLOADED FROM A STORAGE VEHICLE OR STRUCTURE

(71) Applicant: United Parcel Service of America, Inc., Atlanta, GA (US)

(72) Inventor: Joel Stenson, Atlanta, GA (US)

(73) Assignee: United Parcel Service of America, Inc., Atlanta, GA (US)

( * ) Notice: Subject to any disclaimer, the term of this patent is extended or adjusted under 35 U.S.C. 154(b) by 0 days.

(21) Appl. No.: 16/678,223

(22) Filed: Nov. 8, 2019

(65) Prior Publication Data

US 2020/0148488 A1 May 14, 2020

Related U.S. Application Data

(60) Provisional application No. 62/757,450, filed on Nov. 8, 2018.

(51) Int. Cl.
| | |
|---|---|
| *B65G 65/23* | (2006.01) |
| *B65G 65/00* | (2006.01) |
| *B65G 69/00* | (2006.01) |
| *B65G 67/46* | (2006.01) |

(Continued)

(52) U.S. Cl.
CPC ........... *B65G 65/23* (2013.01); *B65G 65/005* (2013.01); *B65G 67/46* (2013.01); *B65G 67/54* (2013.01); *B65G 69/003* (2013.01); *B65G 69/16* (2013.01); *B65G 2814/0205* (2013.01); *B65G 2814/0302* (2013.01)

(58) Field of Classification Search
CPC ...... B65G 65/23; B65G 65/005; B65G 65/02; B65G 67/46; B65G 67/48; B65G 67/54; B65G 67/32; B65G 67/34; B65G 220/0235; B65G 2814/0205; B65G 69/16
See application file for complete search history.

(56) References Cited

U.S. PATENT DOCUMENTS

| | | | | |
|---|---|---|---|---|
| 3,413,932 A | * | 12/1968 | Bennett ................ | B61D 45/006 410/142 |
| 3,602,383 A | * | 8/1971 | Howat ..................... | B64D 9/00 414/414 |

(Continued)

FOREIGN PATENT DOCUMENTS

| | | | | |
|---|---|---|---|---|
| DE | 102010024343 A1 | * | 9/2011 | ............. B65G 65/23 |
| FR | 2788756 B1 | * | 3/2001 | ............. B65G 67/24 |

*Primary Examiner* — Kaitlin S Joerger
(74) *Attorney, Agent, or Firm* — Shook, Hardy & Bacon L.L.P.

(57) ABSTRACT

Systems, methods, and apparatuses for controlling objects being loaded or unloaded from a storage structure or vehicle, such as a trailer. In example embodiments, a plurality of parcels may be stored in or on a trailer that is attached to a cab of a delivery vehicle. Upon arrival at a deposit location, the trailer loaded with the one or more parcels may be removably secured to a an adjustable platform designed to be raised to a predetermined angle for unloading of the one or more parcels. Once the adjustable platform is raised to the predetermined angle, a plurality of adjustable dividing mechanisms may be configured to pivot, allowing for the movement of a controlled volume of the one or more parcels onto the receiving platform.

18 Claims, 1 Drawing Sheet

(51) Int. Cl.
*B65G 69/16* (2006.01)
*B65G 67/54* (2006.01)

(56) References Cited

U.S. PATENT DOCUMENTS

| | | | | |
|---|---|---|---|---|
| 3,863,781 | A * | 2/1975 | Butzow | B61D 9/14 |
| | | | | 414/384 |
| 4,049,311 | A * | 9/1977 | Dietrich | B60J 5/0497 |
| | | | | 410/138 |
| 4,802,810 | A * | 2/1989 | Gunn | B65G 59/08 |
| | | | | 414/414 |
| 4,886,404 | A * | 12/1989 | Jensen | B60P 7/14 |
| | | | | 410/97 |
| 6,247,740 | B1 * | 6/2001 | Smith | B62D 33/042 |
| | | | | 296/181.6 |
| 8,087,859 | B2 * | 1/2012 | Nelson | B60P 3/205 |
| | | | | 410/130 |
| 9,221,572 | B2 * | 12/2015 | Scagliola | B65B 69/00 |
| 9,415,949 | B2 * | 8/2016 | Buse | B65B 69/00 |
| 10,023,405 | B2 * | 7/2018 | Kim | B65G 47/40 |
| 10,442,638 | B2 * | 10/2019 | Kollmuss | B65G 57/10 |
| 2008/0131226 | A1 * | 6/2008 | Pesson | B60P 7/14 |
| | | | | 410/129 |
| 2015/0037123 | A1 * | 2/2015 | Hobbs | B65G 67/32 |
| | | | | 414/362 |
| 2016/0082875 | A1 * | 3/2016 | Squyres | B61D 45/006 |
| | | | | 410/129 |
| 2018/0086245 | A1 * | 3/2018 | Heck | B60P 1/286 |
| 2019/0322475 | A1 * | 10/2019 | Hartmann | B65G 65/02 |
| 2020/0071093 | A1 * | 3/2020 | Hartmann | B65G 65/23 |
| 2020/0148488 | A1 * | 5/2020 | Stenson | B65G 69/006 |
| 2020/0180491 | A1 * | 6/2020 | Das | B60P 1/435 |

\* cited by examiner

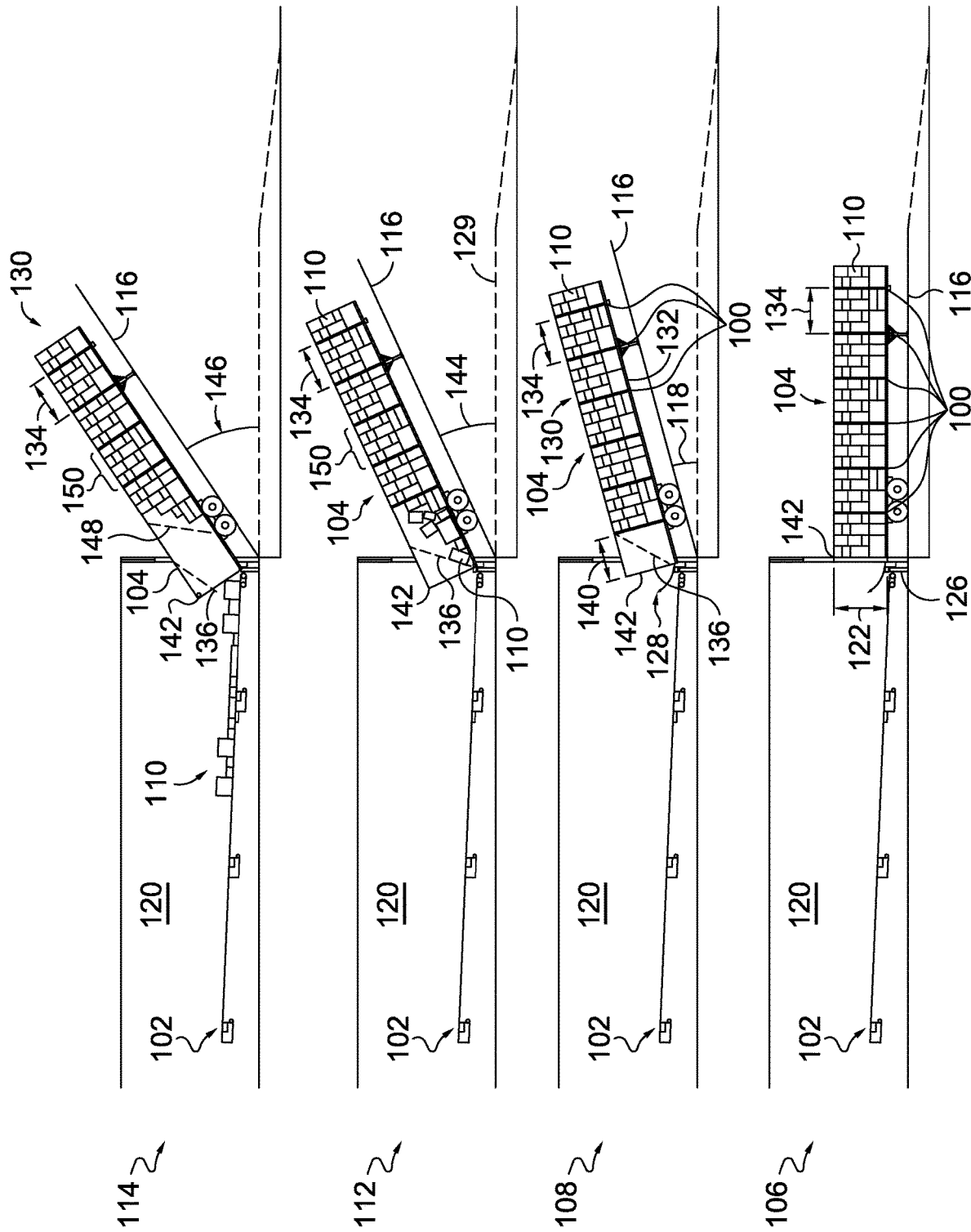

SYSTEMS, METHODS, AND APPARATUSES FOR CONTROLLING OBJECTS BEING UNLOADED FROM A STORAGE VEHICLE OR STRUCTURE

CLAIM OF PRIORITY

This application, having U.S. Non Provisional Application No. 16/678,223, filed on Nov. 8, 2019 and entitled "Systems, Methods and Apparatuses For Controlling Objects Being Unloaded From a Storage Vehicle or Structure," claims priority to U.S. Provisional Patent Application No. 62/757,450, filed Nov. 8, 2018, entitled, "Systems, Methods and Apparatuses For Controlling Objects Being Unloaded From a Storage Vehicle or Structure," the entirety of which is incorporated here by reference.

TECHNICAL FIELD

The subject matter of this disclosure relates to controlling objects, such as parcels, that are being unloaded from a storage structure or vehicle, such as a trailer.

BACKGROUND

Improving the efficiency of loading and unloading storage structures and vehicles is an omnipresent goal in the logistics industry. As the volume of transported objects and parcels grows each year, the need for more efficient and effective object loading and unloading processes increases. This presents an ongoing challenge for logistics carriers that need to efficiently load and unload objects for delivery without damaging or otherwise interrupting the delivery of such objects. For example, efficiently unloading parcels from a trailer onto a receiving platform, such as a conveyor belt, to facilitate sorting of the parcels and preparation of the parcels for routing and delivery is intricate and any error or incurred damage can interrupt or hinder the sorting, routing, and delivery process. Therefore, systems, methods, and apparatuses that allow for efficient and effective loading and/or unloading of objects in such circumstances are needed.

SUMMARY

This summary is intended to introduce a selection of concepts in a simplified form that are further described below in the detailed description section of this disclosure. This summary is not intended to identify key or essential features of the claimed subject matter, and it is also not intended to be used as an aid in isolation to determine the scope of the claimed subject matter.

In brief, and at a high level, this disclosure describes, among other things, systems, methods, and apparatuses for controlling objects being loaded or unloaded from a storage structure or vehicle, such as a trailer. For example, objects, such as parcels, unloaded from a trailer onto a receiving platform or other area in order to facilitate efficient retrieval of such parcels without damaging the parcels during a parcel delivery process are provided. In one disclosed aspect, controlled unloading of one or more parcels via adjustable dividing mechanisms which pivot forward or upward to allow for a predetermined number of parcels to be unloaded from the trailer at a given time for deposit onto a receiving platform or area using gravitational forces are described.

In example embodiments, a plurality of parcels may be stored in or on a trailer that is attached to a cab of a delivery vehicle. Upon arrival at a deposit location, such as, for example, a logistics carrier's facility, the trailer loaded with the one or more parcels may be removably secured to a platform, such as an adjustable platform. The adjustable platform may be designed to be raised to a predetermined angle for unloading of the one or more parcels. Once the adjustable platform is raised to the predetermined angle, a plurality of adjustable dividing mechanisms may be configured to pivot, allowing for the movement of a controlled volume of the one or more parcels onto the receiving platform.

BRIEF DESCRIPTION OF THE DRAWINGS

The subject matter disclosed herein that relates to systems, methods, and apparatuses for controlling the volume of objects loaded and/or unloaded from a trailer is described in detail with reference to the attached drawing figures, which are intended to illustrate non-limiting examples of the disclosed subject matter, in which like numerals represent like elements, wherein:

FIG. 1 depicts multiple side views of the system described herein illustrating how adjustable dividing mechanisms can be used to control a volume of objects or parcels unloaded onto a receiving platform, in accordance with aspects hereof.

DETAILED DESCRIPTION

The subject matter of this disclosure is described herein to meet statutory requirements. However, the description is not intended to limit the scope of the invention. Rather, the claimed subject matter may be embodied in other ways, to include different steps, combinations of steps, features, and/or combinations of features, similar to those described in this disclosure, and in conjunction with other present or future technologies. Moreover, although the terms "step" and/or "block" may be used herein to identify different elements of methods employed, the terms should not be interpreted as implying any particular order among or between various elements except when the order is explicitly described and required.

In general, this disclosure describes systems, methods, and apparatuses for controlling objects being loaded or unloaded from a storage structure or vehicle, such as a wheeled cargo trailer, onto a receiving platform or area. In particular, the systems, methods, and apparatuses disclosed herein allow for controlling a volume of objects or parcels unloaded from a storage vehicle or structure onto a receiving platform or other receiving area. By controlling, or sequencing, the number of objects or parcels unloaded from a storage structure or vehicle, such as a storage trailer, at one time, the amount of pressure applied to individual objects or parcels as they are unloaded may decrease, thereby reducing the likelihood of damaging objects and parcels during an unloading process.

In example embodiments, the system comprises a receiving platform configured to receive one or more parcels or other objects, which may contain one or more items therein, an adjustable platform, a storage structure, and a plurality of adjustable dividing mechanisms located within the storage structure. The storage structure, or as depicted a wheeled cargo trailer, when prepared for unloading, contains the one or more parcels or other objects, and during the unloading process may be removably secured to the adjustable platform. The plurality of adjustable dividing mechanisms located within the wheeled cargo trailer may be configured to pivot, or otherwise shift in orientation, position, and/or configuration, to allow for movement of a controlled volume of the one or more objects or parcels to be released out of the wheeled cargo trailer onto the receiving platform. The use of dynamic and adjustable dividing mechanisms within a storage structure or vehicle such as a wheeled cargo trailer may improve the efficiency of unloading items onto a receiving platform and may also reduce the potential for damaging unloaded objects or parcels, as well as items enclosed therein, by limiting the amount of pressure applied to each individual object or parcel during the unloading process, and in particular at a point at which the objects or parcels reach a transition, such as an angular transition located between a rear door opening of a wheeled cargo trailer and an engaged receiving platform.

The subject matter of this disclosure may be provided as, at least in part, a method, a system, and/or a computer-program product, among other things. Accordingly, certain aspects disclosed herein may take the form of hardware, or may be a combination of software and hardware. A computer-program that includes computer-useable instructions embodied on one or more computer-readable media may also be used. The subject matter hereof may further be implemented as hard-coded into the mechanical design of computing components and/or may be built into a system or apparatus for controlling the volume of objects or parcels unloaded from a wheeled cargo trailer onto a receiving platform. For example, the subject matter may be incorporated into a control system and computing components thereof for controlling the adjusting dividing mechanisms and systems utilizing the same.

Computer-readable media may include volatile media, non-volatile media, removable media, and non-removable media, and may also include media readable by a database, a switch, and/or various other network devices. Network switches, routers, and related components are conventional in nature, as are methods of communicating with the same, and thus, further elaboration is not provided in this disclosure. By way of example, and not limitation, computer-readable media may comprise computer storage media and/or non-transitory communications media.

Computer storage media, or machine-readable media, may include media implemented in any method or technology for storing information. Examples of stored information include computer-useable instructions, data structures, program modules, and/or other data representations. Computer storage media may include, but is not limited to, RAM, ROM, EEPROM, flash memory or other memory technology, CD-ROM, digital versatile discs (DVD), holographic media or other optical disc storage, magnetic cassettes, magnetic tape, magnetic disk storage, and other storage devices. These memory components may store data momentarily, temporarily, and/or permanently, and are not limited to the examples provided herein.

In general, the term "system" may refer to, for example, one or more computers, computing devices, mobile phones, desktops, notebooks or laptops, distributed systems, servers, gateways, switches, processing devices, or a combination of processing devices adapted to perform the functions described herein, as well as mechanical, electrical, hydraulic, pneumatic, and/or other physical systems and/or components. As will be understood, in one embodiment, a system for controlling the volume of objects or parcels unloaded from a wheeled cargo trailer may include a processor that communicates with other computing hardware or software elements within the system via a system interface or bus. The processor may be embodied in a number of different ways. For example, the processor may be embodied as one or more processing elements, one or more microprocessors with accompanying digital signal processors, one or more processors without accompanying digital signal processors, one or more coprocessors, one or more multi-core processors, one or more controllers, and/or various other processing devices including integrated circuits such as, for example, an application specific integrated circuit (ASIC), a field programmable gate array (FPGA), a programmable logic controller (PLC), a hardware accelerator, and/or the like.

In one example embodiment, a processor may be configured to execute instructions stored in a device memory or stored such that it is otherwise accessible to the processor. As such, whether configured by hardware or software methods, or by a combination thereof, the processor may represent an entity capable of performing operations according to embodiments of the present invention when configured accordingly. A display device/input device for receiving and displaying data may also be included in, or associated with, the carrier system. The display device/input device may be, for example, a keyboard or pointing device that is used in combination with a monitor. The carrier system may further include transitory and non-transitory memory, which may include both random access memory (RAM) and read-only memory (ROM). The carrier system's ROM may be used to store a basic input/output system (BIOS) containing the basic routines that help to transfer information to the different elements within the carrier system.

In addition, in one embodiment, the carrier system may include at least one storage device, such as a hard disk drive, a CD drive, a DVD drive, and/or an optical disk drive for storing information on various computer-readable media. The storage device(s) and its associated computer-readable media may provide non-volatile storage. The computer-readable media described above could be replaced by any other type of computer-readable media, such as embedded or removable multimedia memory cards (MMCs), secure digital (SD) memory cards, Memory Sticks, electrically erasable programmable read-only memory (EEPROM), flash memory, hard disk, and/or the like. Additionally, each of these storage devices may be connected to the system bus by an appropriate interface.

Furthermore, a number of executable instructions, applications, scripts, program modules, and/or the like may be stored by the various storage devices and/or within RAM. Such executable instructions, applications, scripts, program modules, and/or the like may include an operating system, a dispatch module, and a handling instruction module. The dispatch module and the handling instruction module may control certain aspects of the operation of the unloading system with the assistance of the processor and operating system, although the functionality need not be modularized. In addition to the program modules, the carrier system may store and/or be in communication with one or more databases.

Also located within and/or associated with the system, in one embodiment, is a network interface for interfacing with various computing entities. This communication may be via the same or different wired or wireless networks (or a combination of wired and wireless networks), as discussed above. For instance, the communication may be executed using a wired data transmission protocol, such as fiber distributed data interface (FDDI), digital subscriber line (DSL), Ethernet, asynchronous transfer mode (ATM), frame relay, data over cable service interface specification (DOCSIS), and/or any other wired transmission protocol. Similarly, the carrier system may be configured to communicate via wireless external communication networks using any of a variety of protocols, such as 802.11, GSM, EDGE, GPRS, UMTS, CDMA2000, WCDMA, TD-SCDMA, LTE, E-UTRAN, Wi-Fi, WiMAX, UWB, NAMPS, TACS and/or any other wireless protocol.

It will be appreciated that one or more of the system's components may be located remotely from other system components. Furthermore, one or more of the components may be combined and additional components performing functions described herein may be included in the system for shifting objects or parcels.

Referring now to FIG. 1, multiple illustrations of the system described herein depict how adjustable dividing mechanisms 100 can be used to control how objects 110 are unloaded from a storage vehicle, such as a wheeled cargo or stationary trailer 104 shown in FIG. 1, onto a receiving platform 102, in accordance with embodiments hereof. The multiple illustrations 106, 108, 112, and 114 show the wheeled cargo trailer 104, the receiving platform 102, and also show an adjustable platform 116 that is used to facilitate the unloading of the objects 110 from the wheeled cargo trailer 104 by pivoting the wheeled cargo trailer 104 upward during the unloading process. In particular, FIG. 1 illustrates how the adjustable platform 116 is raised to predetermined angles 118, 144, and 146 and the adjustable dividing mechanisms 100 are pivoted upward within the wheeled cargo trailer 104 toward to the top surface 130 to facilitate sequenced unloading of the one or more objects 110 onto the receiving platform 102.

In the bottom image 106, the wheeled cargo trailer 104 is removably secured to the adjustable platform 116. The wheeled cargo trailer 104 contains the one or more objects 110 that are separated from one another by the plurality of adjustable dividing mechanisms 100. As shown in the illustration 106 provided in FIG. 1, the wheeled cargo trailer 104 is in a position that allows the rear door opening (located at the end of the wheeled cargo trailer 104) to abut a receiving area opening 122. The receiving platform 102 is located within receiving area 120 and has a first receiving end 126 that is abutted next to the receiving area opening 122 so that the one or more objects 110 may be unloaded onto the receiving platform 102 from the wheeled cargo trailer 104.

Next, illustration 108 shows how the adjustable platform 116 has been raised to a predetermined angle 118 to support shifting and unloading of the objects 110 onto the receiving platform 102. As shown in the example illustration 108, the predetermined angle 118 of the raised adjustable platform 116 is approximately 45 degrees. However, as seen in illustrations 112 and 114, the adjustable platform 116 may be raised further, or rather, angled more steeply, to facilitate the shifting and unloading of the objects 110 into the receiving area 120. The raising of the adjustable platform 116 results in larger angles 144 and 146 between the wheeled cargo trailer 104 and a surface on which the wheeled cargo trailer 104 sits (e.g., angles 144 and 146 may be between 0-90 degrees). It is contemplated that the angle of the raised adjustable platform 116 may vary depending on the configuration and positioning of the wheeled cargo trailer 104, the adjustable platform 116, and the receiving platform 102. Further, the angle at which the adjustable platform 116 is raised may be dependent on the number of objects 110 loaded within the wheeled cargo trailer 104. The adjustable platform 116 may be raised by actuators, hydraulic cylinders, or any other mechanism that are operable to engage and move the adjustable platform 116 in a desired direction or angular motion while allowing the wheeled cargo trailer 104 to stay in position on the adjustable platform 116. In this respect, one or more engaging and securing components may be used to attach the wheeled or stationary cargo trailer 104, or another object, to the adjustable platform 116, increasing stability during the unloading process.

As further shown in FIG. 1, a plurality of adjustable dividing mechanisms 100 are located within the wheeled cargo trailer 104 between certain portions of the objects 110. Each adjustable dividing mechanism 100 is configured to pivot upward within the wheeled cargo trailer 104 toward the top surface 130 to allow for sequenced and/or controlled movement of a certain volume of the objects 110 onto the receiving platform 102. Each dividing mechanism 100 may be mechanically interconnected or communicatively coupled to a controller that is connected to a computing system. The computing system may be configured to determine when each dividing mechanism 100 should be pivoted to allow the next set of objects 110 to be released for deposit onto the receiving platform 102. The direction of movement of the adjustable dividing mechanisms 100 are shown via arrow 128, which illustrates that the adjustable dividing mechanism 100 will pivot towards the top surface 130 of the wheeled cargo trailer 104 and away from the bottom surface 132 of the wheeled cargo trailer 104. As such, the adjustable dividing mechanism 100 may be removably secured to the bottom surface 132 of the wheeled cargo trailer 104 (e.g., it may rest on a back stop or an engaging component at the bottom surface 132 in the non-pivoted position). In this respect, it is contemplated that the adjustable dividing mechanism 100 may be secured to the bottom surface 132 of the wheeled cargo trailer 104 using a variety of structures, including but limited to, fitting into a groove that locks the adjustable dividing mechanism 100 into place. Further, it is also contemplated that in other aspects the adjustable dividing mechanism 100 may simply rest on the bottom surface 132 of the wheeled cargo trailer 104.

Moreover, as shown in illustrations 106, 108, 112, and 114, each adjustable dividing mechanism 100 is separated from the next adjustable dividing mechanism 100 by a predetermined distance or space 134. The space 134 between each adjustable dividing mechanism 100 is shown to be equal in the images of FIG. 1. However, it is contemplated that the space 134 between each adjustable dividing mechanism 100 may vary such that the space 134 between different adjustable dividing mechanisms 100 may or may not be equal. The space 134 between each dividing mechanism 100 within the wheeled cargo trailer 104 results in a plurality of separated storage compartments 150, each of which may contain one or more of the objects 110 to be unloaded as part of a staged unloading process. Further, in contemplated aspects, a computing system may determine the number of objects 110 to be placed within each storage compartment 150. This determination may be based on the shape, size, and weight of each object 110, or a variety of other factors.

Continuing with FIG. 1, illustration 108 depicts the adjustable platform 116 as it is being raised to prepare for unloading of objects 110. In this configuration, adjustable divider 136 is shown starting to pivot upward to open the area 140 containing one or more objects 110. Also, as shown, the rear end 142 of the wheeled cargo trailer 104 has protruded through the receiving area opening 122 and is therefore located at least partially within receiving area 120. While illustration 108 depicts the wheeled cargo trailer 104 protruding at least partially into the receiving area 120, it is contemplated that in other embodiments, the wheeled cargo trailer 104 may remain fully outside of the receiving area 120 while unloading the objects 110 onto the receiving platform 102.

Next, as shown in image 112, the adjustable platform 116 has been raised further, forming the angle 144 between the adjustable platform 116 and a surface 129. In this example illustration, angle 144 is greater than angle 118, but remains less than 90 degrees. The one or more objects 110 therefore being to shift off of the wheeled cargo trailer 104, unloading onto the receiving platform 102. As mentioned, by controlling and limiting the volume of objects 110 unloaded at once via the pivoting of the adjustable dividing mechanism 100, there is less pressure on the objects 110 as they are unloaded, which results in a decreased potential for damage to the objects 110 or any items enclosed within each of the objects 110.

Illustration 114 depicts the continued controlled unloading of the objects 110 from the wheeled cargo trailer 104. In illustration 114, the wheeled cargo trailer 104, shown secured to the adjustable platform 116, has been raised, or pivoted, upward further to form angle 146 which is greater than the angle 144 and 118 depicted in the illustrations 112 and 108, while still being less than 90 degrees. In this sense, in illustration 114, the adjustable platform 116 has been raised higher in order to unload additional objects 110 stored further within in the wheeled cargo trailer 104. As seen in image 114, dividing mechanism 148 has also been pivoted (e.g., in a rotational direction opposite to that of the wheeled cargo trailer 104), thereby providing for the controlled unloading of additional objects 110 onto the receiving platform 102.

Many modifications and other embodiments of the disclosed subject matter will become apparent to one skilled in the art to which this invention pertains having the benefit of the teachings presented in the foregoing descriptions and the associated drawings. Therefore, it is to be understood that the invention is not to be limited to the specific embodiments disclosed and that modifications and other embodiments are intended to be included within the scope of the appended claims. Although specific terms are employed herein, they are used in a generic and descriptive sense only and not for purposes of limitation.

It should be emphasized that the above-described embodiments of the present invention, particularly any "preferred embodiments" or "exemplary embodiments" are merely possible examples of the implementations, merely set forth for a clear understanding of the principles of the invention. Any variations and modifications may be made to the above-described embodiments of the invention without departing substantially from the spirit of the principles of the invention. All such modifications and variations are intended to be included herein within the scope of the disclosure and present invention and protected by the following claims.

In concluding the detailed description, it should be noted that it will be obvious to those skilled in the art that many variations and modifications can be made to the preferred embodiment without substantially departing from the principles of the present invention. Also, such variations and modifications are intended to be included herein within the scope of the present invention as set forth in the appended claims. Further, in the claims hereafter, the structures, materials, acts and equivalents of all means or step-plus function elements are intended to include any structure, materials or acts for performing their cited functions.

What is claimed is:

1. A system for controlling a volume of objects being unloaded from a storage structure or vehicle, the system comprising:
    a receiving platform configured to receive one or more objects;
    an adjustable platform;
    a storage structure comprising the one or more objects and removably secured to the adjustable platform; and
    a plurality of adjustable dividing mechanisms located within the storage structure and configured to pivot to allow for unloading of a controlled volume of the one or more objects onto the receiving platform, wherein the pivoting of the plurality of adjustable dividing mechanisms is controlled by a controller connected to a computing system.

2. The system of claim 1, wherein the plurality of adjustable dividing mechanisms are located at equally spaced positions within the storage structure.

3. The system of claim 1, wherein the plurality of adjustable dividing mechanisms are spaced at different distances from each another within the storage structure.

4. The system of claim 3, wherein the spacing of the adjustable dividing mechanisms results in a plurality of storage compartments being formed within the storage structure.

5. The system of claim 4, wherein a predetermined number of objects to be contained within each storage compartment is calculated based on a shape, a size, and a weight of each object to be placed within each storage compartment.

6. The system of claim 1, wherein the one or more objects are unloaded to the receiving platform from a door of the storage structure.

7. The system of claim 1, wherein the unloading of the controlled volume of the one or more objects is sequenced to reduce pressure applied to at least some of the objects during unloading relative to an unsequenced unloading of the objects.

8. The system of claim 1, wherein the adjustable platform supporting the secured storage structure is raised to a predetermined angle for unloading of the one or more objects.

9. The system of claim 8, wherein gravitational forces urge the one or more objects from the storage structure onto the receiving platform as a result of the adjustable platform being raised to the predetermined angle and at least one of the plurality of adjustable dividing mechanisms pivoting upwards.

10. A system for controlling a volume of objects being unloaded from a storage structure or vehicle, the system comprising:
    a receiving platform configured to receive one or more objects;
    an adjustable platform positioned at a predetermined angle for unloading of the one or more objects;
    a storage structure comprising the one or more objects and removably secured to the adjustable platform; and
    a plurality of adjustable dividing mechanisms located within the storage structure and configured to pivot to allow for unloading of a controlled volume of the one or more objects onto the receiving platform, wherein the pivoting of the plurality of adjustable dividing mechanisms is controlled by a controller connected to a computing system.

11. The system of claim 10, wherein the storage structure is a cargo trailer.

12. The system of claim 10, wherein the plurality of adjustable dividing mechanisms pivot forward to allow for a predetermined number of parcels to be unloaded from the storage structure onto the receiving platform.

13. The system of claim 10, wherein the plurality of adjustable dividing mechanisms pivot upward to allow for a predetermined number of parcels to be unloaded from the storage structure onto the receiving platform.

14. The system of claim 10, wherein the unloading of the controlled volume of the one or more objects onto the receiving platform occurs at a logistic carrier's facility.

15. The system of claim 1, wherein the computing system is configured to determine when each dividing mechanism should be pivoted to allow one or more additional objects to be released for deposit onto the receiving platform.

16. The system of claim 10, wherein the adjustable platform is positioned to the predetermined angle by an actuator.

17. The system of claim 10, wherein gravitational forces urge the one or more objects from the storage structure onto the receiving platform as a result of the adjustable platform being raised to the predetermined angle and at least one of the plurality of adjustable dividing mechanisms pivoting upwards.

18. The system of claim 10, wherein the one or more objects are unloaded to the receiving platform from a rear door of the storage structure.

\* \* \* \* \*

UNITED STATES PATENT AND TRADEMARK OFFICE
CERTIFICATE OF CORRECTION

PATENT NO. : 10,954,084 B2
APPLICATION NO. : 16/678223
DATED : March 23, 2021
INVENTOR(S) : Joel Stenson Page 1 of 1

It is certified that error appears in the above-identified patent and that said Letters Patent is hereby corrected as shown below:

In the Specification

In Column 1, Line 13, delete "2018," and insert -- 2018 --, therefor.

Signed and Sealed this
Eighth Day of June, 2021

Drew Hirshfeld
*Performing the Functions and Duties of the*
*Under Secretary of Commerce for Intellectual Property and*
*Director of the United States Patent and Trademark Office*